United States Patent [19]

Pepoy et al.

[11] Patent Number: 4,822,419

[45] Date of Patent: Apr. 18, 1989

[54] LITHOGRAPHIC INK COMPOSITION AND PROCESS FOR MAKING SAME

[75] Inventors: Louis J. Pepoy; Thomas E. Foye, both of Holland, Mich.; Sherwin P. Malchick, Sparta, N.J.

[73] Assignee: BASF Corporation, Parsippany, N.J.

[21] Appl. No.: 118,263

[22] Filed: Nov. 9, 1987

[51] Int. Cl.$^4$ .............................................. C09D 11/06
[52] U.S. Cl. ............................................ 106/27; 106/2; 106/20; 106/22; 106/23; 106/30; 106/32
[58] Field of Search .................. 106/2, 20, 27, 28, 30, 106/32, 22, 23

[56] References Cited

U.S. PATENT DOCUMENTS 4,400,216  8/1983  Arora .................................... 106/23

OTHER PUBLICATIONS

Derwent Abstract Accession No. 79-14165B/08, Belgium patent No. 869752, Feb. 14, 1979.
Derwent Abstract Accession No. 81-69820D/38, World Patent No. WO8102395, Sept. 3, 1981.

Primary Examiner—Amelia Burgess Yarbrough
Attorney, Agent, or Firm—Rupert B. Hurley, Jr.

[57] ABSTRACT

A lithographic ink has an oil-soluble additive incorporated thereinto, the additive producing beneficial effects, especially with respect to reducing the pH drift of the ink during use. The additive is produced by combining a primary, secondary, tertiary, or quaternary amine with a polybasic organic acid.

11 Claims, No Drawings

LITHOGRAPHIC INK COMPOSITION AND PROCESS FOR MAKING SAME

BACKGROUND OF THE INVENTION

The present invention pertains to an improved lithographic ink composition and to a process for making the improved composition. In particular, the present invention enables the production of an ink composition having a stable pH in the printing process. pH stability is highly desirable, as without pH stability smudging of the resulting image will result, due to the acidic fountain solution becoming more basic at the region in which the fountain solution interfaces with the ink. The pH sensitivity is aggravated when an ink comprising a Lithol Rubine pigment is employed in the printing process.

The closest prior art of which applicants are aware is PCT International Publication No. WO 84/02142, published June 7, 1984, assigned to Inmont Corporation of Clifton, N.J. Unlike the invention described herein, this publication teaches the incorporation of water-soluble buffers into the fountain solution, not the ink. The Inmont publication does not teach the incorporation of a buffer into a nonaqueous ink. This difference is believed to be critical as it is believed that addition of the buffer to the fountain solution significantly decreases the availability of buffer to the interface between the ink and the fountain solution, as is explained below.

In the art of lithographic printing, an oleophilic, oil-based printing ink composition is mixed with a water-based, oleophobic fountain solution. Immediately after the mixing of the oil ink with the fountain solution, a water-in-oil emulsion is created by subjecting the combination of ink and fountain solution to severe turbulence and shear. Shortly after the water-in-oil emulsion is made, the emulsion contacts a printing plate which has both oleophilic and oleophobic surfaces thereon. If the pH of the fountain solution is not within the proper range, image definition at the interface between oleophilic and oleophobic regions is blurred, reducing image resolution and occasionally causing smudging.

In the process of the prior art, a water-soluble buffer is mixed with a fountain solution. During the printing process, the buffered fountain solution is combined with and emulsified within an oleophilic ink. A water-in-oil emulsion is formed thereby. The buffer, preferring the aqueous fountain solution, remains within the fountain solution. Since there is no significant oil-solubility for any significant exchange of buffer from the hydrophilic fountain solution to the oleophilic ink, the result is that virtually all of the buffer remains within the fountain solution. Thus, at the interface between the fountain solution and the ink, the availability of buffer at the interface region is "one-sided." In other words, the only buffer reaching the interface to control pH drift is buffer supplied from the fountain solution side of the interface.

The present invention utilizes an oil-soluble buffer. The buffer is added to the oleophilic ink. The ink and fountain solution are then combined and a water-in-oil emulsion is formed, with the resulting emulsion being used immediately thereafter in the printing process. The vast majority of buffer remains in the oleophilic ink phase. A minor proportion of the acid portion of the buffer (i.e. that which is disassociated) migrates into the fountain solution. In comparison with the prior art, there is a greater balance between the amount of buffer in the ink and the amount of buffer in the fountain solution. The result of this balance is a greater availability of buffer to the interface. This greater availability of buffer to the interface provides greater pH control (i.e. less pH drift) during the resulting printing process.

The present invention is distinguishable from the reference in that the present invention employs an ink composition in which the buffer is added to the ink, as opposed to being added to the fountain solution.

BRIEF SUMMARY OF THE INVENTION

The improved lithographic ink composition of the present invention comprises an ink suitable for lithographic use wherein the ink further comprises at least 0.1 percent by weight of a substantially oil-soluble buffer. Most preferably, the buffer is the product prepared by the reaction of a primary, secondary, tertiary or quaternary amine, with a polybasic organic acid (most preferably critic acid).

The process of the present invention is a process for making an improved lithographic ink composition, the process comprising the steps of: (a) combining an oil-soluble buffer with an oleophilic lithographic ink, whereby a buffered ink is formed and (b) adding the resulting buffered ink to an aqueous fountain solution; and (c) emulsifying the fountain solution within the buffered ink. In addition to the general process outlined immediately above, the buffer is most preferably the reaction product of a primary, secondary, tertiary, or quaternary amine with a polybasic organic acid. The acid is most preferably citric acid. Furthermore, the ink employed most preferably comprises a Lithol Rubine ink.

DETAILED DESCRIPTION OF THE PREFERRED EMBODIMENT

The present invention pertains to an ink composition having at least 0.1 percent, based on weight of ink composition, of a pH-stabilizing additive therein, the additive most preferably being an oil-soluble salt. The oil-soluble salt acts as a buffer to stabilize the pH of the ink and fountain solution with which the ink is combined.

The oil-soluble salt is produced by combining a primary, secondary, tertiary, or quaternary amine with a polybasic organic acid. The oil-soluble amine is combined with the acid in a molar ratio of between 1:1 and 2:1. Preferably the molar ratio of the amine-to-acid is approximately 1:1.

Suitable amines are believed to include aliphatic oil-soluble monoamines which are primary, secondary, tertiary, or quaternary amines of which the carbon chain may be saturated or unsaturated, branched or straight. Examples of such amines include octylamine, N,N-diethyl propylamine, decylamine, n-dodecylamine, tetradecyl amine, n-octadecyl amine, cocoamine, dicocoamine, dimethylcocoamine, methyl dicocoamine, cocotrimethyl ammonium chloride, dicocodimethyl ammonium chloride, tallow amine, dimethyl tallow amine, tallow trimethyl amine, hydrogenated tallow amine, dihydrogenated tallow amine, dimethylhydrogenated tallow amine, methyl dihydrogenated tallow amine, dihydrogenated tallow dimethyl ammonium chloride, oleylamine, dimethyl oleylamine, soyaamine, dimethyl soyaamine, disoyaamine, soyatrimethyl ammonium chloride, stearyl trimethyl ammonium chloride, lauryl trimethyl ammonium chloride and cetyl trimethyl ammonium chloride.

Preferred amines are believed to be cocotrimethyl ammonium chloride, dicocodimethyl ammonium chloride, dihydrogenated tallow dimethyl ammonium chloride, stearyl trimethyl ammonium chloride, lauryl trimethylammonium chloride and cetyl trimethyl ammonium chloride. The most preferred amine is dihydrogenated tallow dimethyl ammonium chloride.

The polybasic organic acid has at least 2 carbonyl groups thereon. Suitable polybasic acids are believed to include dibasic water-soluble organic acids such as oxalic, malonic, succinic, glutaric, adipic, pimelic, maleic, malic, tartaric, and citric. Preferred polybasic acids are believed to include adipic acid and citric acid. The most preferred polybasic acid is citric acid.

The substantially oil-soluble buffer used in the present invention has a solubility of at least 1 gram per liter in the oleophilic ink. However, the buffer preferably has a solubility of at least 20 grams per liter in the oleophilic ink.

Example 1 illustrates a preferred method of making a most preferred additive, as well as the use of this additive in a lithographic ink flush. Example 2 illustrates the use of the same additive in a different flush. Example 3 illustrates the use of a different additive in the flush found in Example 1. Example 4 is a comparative example illustrating a process performed without the use of an additive. Table I summarizes the results observed in Examples 1-4.

EXAMPLE 1

In order to make a pure salt, 57 grams of 75 percent active dimethyl(hydrogenated-tallow)ammonium chloride were dissolved in 100 grams methanol, and 18 grams of citric acid were dissolved in 50 grams of methanol, after which the two solutions were mixed together, at room temperature. The methanol was then removed by evaporation, leaving the pure salt of the 75 percent active dimethyl(hydrogenated-tallow)ammonium chloride and citric acid.

The salt from above was then utilized as an additive to a Lithol Rubine flush, in order to reduce pH drift. The pigment flush, herein designated Flush I, was made as described below. To determine what effect the additive had on both pH stability and bleed, the following process was carried out:

(A) 50 grams of Flush I were weighed out on Mylar TM, and placed on a hot plate at 230° F.;
(B) then 0.5 grams of the additive produced above were weighed out and placed on top of Flush I;
(C) Flush I and the additive were then thoroughly mixed together while on the hot plate; the mixing was carried out over a period of about two minutes; and
(D) the mixture of Flush I and additive were then transferred to a glass slab and thoroughly mixed thereon.

The additive/Flush I combination was then tested for pH drift by carrying out the following procedure.
1. 50 grams of the test ink were placed in a Duke mixer;
2. the mixer was run for 50 revolutions;
3. 50 grams of the fountain solution were then added;
4. the mixer was run for 450 revolutions;
5. as much of the fountain solution as possible was decanted; and
6. the change in the pH of the fountain solution was calculated by measuring the pH of the fountain solution both before and after the fountain solution was mixed with the ink.

EXAMPLE 2

An additive to control pH drift was made as described in Example 1. The additive was then used to prepare Flush II (see preparation details below). About 0.5 grams of the additive were combined with 50 grams of Flush II. The additive and Flush II were then mixed, as described in Example I. The combination of additive and Flush II was then tested for pH drift (as described in Example 1), with the results of these tests also being shown in Table I.

EXAMPLE 3

A different additive than the additive utilized in Example 1 was prepared by the following procedure. 20 Parts of an octadecylamine were added to 51.1 parts of Magiesol 47 (a hydrogenated petroleum middle distillate boiling at 445° F. to 525° F.). This mixture was heated to 200° F. to obtain a clear solution. 10 Parts of adipic acid were then added to the clear solution. The adipic acid immediately reacted with the octadecylamine to form the soluble salt.

The additive was then mixed with Flush I in the ratio of 1 gram additive to 50 grams of Flush I. The flush and additive were combined exactly as described in Example 1, and the test for pH drift was performed exactly as for Example 1. The result of this test is also shown in Table I.

EXAMPLE 4 (COMPARATIVE EXAMPLE)

Flush I, having no additives therein, was subjected to a pH drift test as described in Example 1. The result of this test is also reported in Table I.

TABLE I

| Example | pH Drift | Additive Level |
| --- | --- | --- |
| 1 | 0.05 | 1% |
| 2 | 0.11 | 1% |
| 3 | 0.67 | 2% |
| 4 | 3.23 | 0% |

The advantageous effect of the additive on the flush is revealed by Table I. Each of Examples 1-3 evidenced significantly less pH drift than the control, Example 4.

PREPARATION OF FLUSH I

A presscake contained 500 parts (21-22 percent solids by weight of presscake) of a Lithol Rubine pigment. The presscake was divided into six fractions of equal weight. Two of these fractions were added to a sigma blade mixer known as a flusher. The flusher was started. Steam was applied to the jacket until the temperature reached 65° C. Then the following materials were added:
(a) 108 parts of a linseed oil alkyd; and
(b) 179 parts of a mixture of 60 weight percent of a maleic acid modified rosin ester of abietic acid/40 weight percent Magiesol 47;

after which the first break occured and the flusher was stopped. The clear aqueous phase was poured off.

Four remaining breaks were then carried out as follows. One fraction (i.e. one sixth) of the presscake was first added to the flusher. The flusher was started again and heated to 65° C. A fraction of 149 remaining parts of 60 weight percent of a 140° C. melting hydrocarbon resin/40 weight percent Magiesol 47 were added as needed to achieve each remaining break. The flusher was stopped after each break. With each break, the clear aqueous phase was decanted After the last break was poured, the flusher was started, sealed and vacuum was applied. The flusher was run until the batch temperature reached 110° C. At this point the cold water was turned on the jacket, 60 parts of 60 weight percent of a maleic acid modified rosin ester of abietic acid/40 percent Magiesol 47 and 15 parts of water were added, and the flusher was stopped while still under vacuum. The flusher was occasionally started and quickly stopped over a period of fifteen minutes to allow for rapid cooling. After this point, the temperature of the batch was 70° C. and the cold water on the jacket was turned off. The flusher was started, maintaining vacuum and the remaining flush thinning material composed of 320 parts of 60 weight percent of a maleic acid modified rosin ester of abietic acid/40 percent Magiesol 47 plus an additional 211 parts of Magiesol 47 were added as fast as possible. The vacuum was then shut off and the finished product removed from the flusher.

PREPARATION OF FLUSH II

A presscake contained 500 parts (21-22 percent solids by weight of presscake) of a Lithol Rubine pigment. The presscake was divided into four fractions of equal weight. Two of these fractions were added to a sigma blade mixer known as a flusher. The flusher was started. Steam was applied to the jacket until the temperature reached 65° C. Then 176 parts of 72 weight percent of a maleic acid modified rosin ester of abietic acid/28 weight percent Magiesol 47, along with 52 parts of a linseed oil alkyd were added to the flusher, after which a first break occured and the flusher was stopped. The clear aqueous phase was poured off. 125 additional parts of pigment in the form of one additional fraction of the presscake were added to the flusher. The flusher was started and again heated to 65° C. 150 parts of 60 weight percent of a 140° C. melt hydrocarbon resin/40 weight percent Magiesol 47 were added, the second break occured and the flusher was stopped. Again, the clear aqueous phase was decanted. 125 remaining parts of pigment, in the form of the last remaining fraction of the presscake, were added to the flusher. The flusher was started and again heated to 65° C. 52 remaining parts of 60 weight percent of the 140° C. melt hydrocarbon resin/40 weight percent Magiesol 47 were added, the third and final break occured, and the flusher was stopped. Again the clear aqueous chase was decanted. After the least break was poured, 77 parts of 72 weight percent of a maleic acid modified rosin ester of abietic acid/28 weight percent Magiesol 47 were added to the flusher. Then the flusher was started, sealed and vacuum applied. The flusher was run until the batch temperature reached 110° C. At this point, the cold water was turned on the jacket and 60 parts of 60 weight percent of a 140° C. melt hydrocarbon resin/40 weight percent Magiesol 47 were added, along with 15 parts of water, and the flusher was stopped while still under vacuum. The flusher was occasionally started and stopped over a period of 15 minutes to allow for rapid cooling. After this point, the temperature of the batch was 70° C. and the cold water on the jacket was turned off.

The flusher was started, maintaining vacuum and the remaining flush thinning material composed of:
361 parts of 60 weight percent of a 140° C. melt hydrocarbon resin/40 weight percent Magiesol 47; and 65 parts Magiesol 47 was added as fast as possible. The vacuum was then shut off and the finished product removed from the flusher.

We claim:

1. An improved ink composition comprising at least 0.1 percent based on weight of ink composition of a substantially oil-soluble buffer, wherein the buffer is a reaction product of a primary, secondary, or tertiary monoamine and a polybasic organic acid.

2. An improved ink composition as described in claim 1 wherein the buffer is a reaction product of a quaternary monoamine and a polybasic organic acid.

3. An improved ink composition as described in claim 1 wherein the organic acid is citric acid.

4. An improved ink composition as described in claim 1 wherein the ink comprises a Lithol Rubine ink.

5. An improved ink composition as described in claim 2 wherein the ink comprises a Lithol Rubine ink.

6. An improved process for making a lithographic ink emulsion, comprising the steps of:
    (a) combining an oil-soluble buffer with an oil ink, wherein the oil-soluble buffer comprises at least 0.1 percent on weight of ink composition of a substantially oil soluble buffer, wherein the buffer is a reaction product of a primary, secondary, or tertiary monoamine and a polybasic organic acid, whereby a buffered ink is formed; and
    (b) adding the buffered ink to an aqueous fountain solution; and
    (c) emulsifying the fountain solution within the buffered ink.

7. A method as described in claim 6 wherein the lithographic ink comprises a Lithol Rubine ink.

8. A method as described in claim 6 wherein the buffer has a solubility of at least 20 grams per liter in the ink.

9. A process as described in claim 8 wherein the polybasic organic acid is citric acid.

10. A method as described in claim 6 wherein the oil-soluble buffer is a reaction product of a quaternary monoamine and a polybasic organic acid.

11. A method as described in claim 10 wherein the ink comprises a Lithol Rubine ink.

* * * * *